Figure 1:
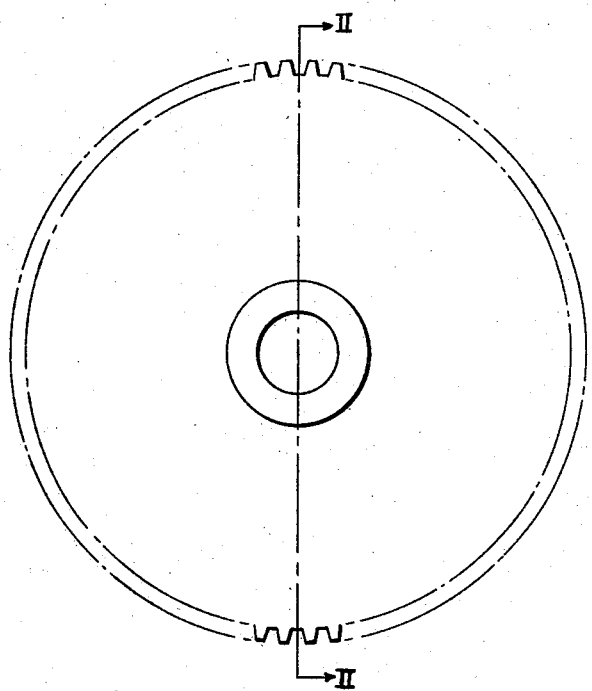

June 17, 1930.  G. C. KENT ET AL  1,764,409
GEAR
Filed Feb. 10, 1925

WITNESSES:
R. J. Butler.
W. B. Jaspert.

INVENTORS
George C. Kent &
Rudolf Siegfried.
BY
Wesley G. Carr
ATTORNEY

Patented June 17, 1930

1,764,409

UNITED STATES PATENT OFFICE

GEORGE C. KENT, OF TURTLE CREEK, AND RUDOLF SIEGFRIED, OF PITTSBURGH, PENNSYLVANIA, ASSIGNORS TO WESTINGHOUSE ELECTRIC & MANUFACTURING COMPANY, A CORPORATION OF PENNSYLVANIA

GEAR

Application filed February 10, 1925. Serial No. 8,193.

Our invention relates to composite articles, more particularly to wheel elements such as gear wheels, car wheels or the like, in which it is desired to obtain noiseless and smooth-running operating characteristics.

It is among the objects of our invention to provide a composite wheel structure having a unitary hub and rim section and a resilient intermediate portion which shall be formed in a simple and efficient manner and which shall constitute an integral part of the working body portion.

Another object of our invention is to provide composite articles of the above designated character which shall be relatively inexpensive to manufacture and adapted for production in quantities with uniform results.

Another object of our invention is to provide a wheel element having a composite body portion in which the web structure shall be of a texture different from that of the rim or working body portion in order to produce sufficient resilience to permit torsional and axial deflection of varying degrees without permanently distorting the alignment of the rim portion with the seating hub or center by means of which the element is mounted.

Various types of composite wheel structures have been heretofore proposed embodying non-metallic filler materials such as textile fibers, paper, cork and the like, compounded with a binding agent such as a phenolic condensation product with the purpose of attaining certain physical characteristics of the material that specifically adapts it for use in applications where a high degree of resilience or flexibility is desired. The object of all these composite elements is to eliminate noise resulting from impact or shock to which they are subjected under normal or excessive operating conditions and the facility with which these objects are obtained depends upon the nature of the composition and the manner of forming it into the structural shapes in which it is utilized.

Our present invention provides composite wheel structures which shall be mechanically durable and formed to provide certain mechanical characteristics as will be hereinafter described.

We form a wheel of a hub and rim construction of composite materials which are integrally joined by a body portion of a similar material, the joining portion constituting a web section. We utilize a filler material in the web portion of the wheel that is not as dense but is more flexible than the remaining body portion thereof to provide a resilient cross section.

Figure 2:
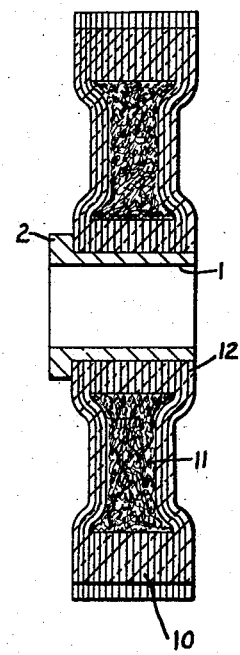
Figure 3:
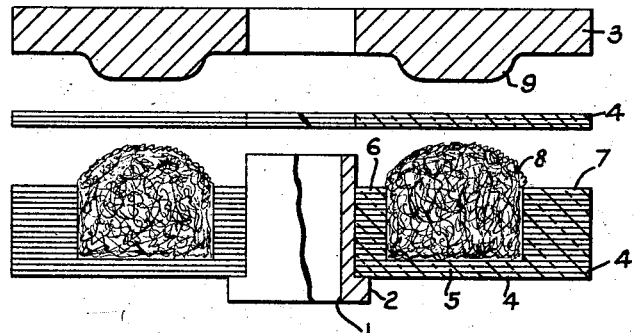

In the accompanying drawing constituting a part hereof and in which like reference characters designate like parts:

Figure 1 is a side elevational view of a composite wheel embodying the principles of my invention, Fig. 2 is a cross sectional view thereof taken along the line II—II of Fig. 1, and Fig. 3 is an exploded view thereof showing the hub bushing and the assembled material together with a pressure platen assembled for the molding operation.

Referring to Fig. 3, the structure therein illustrated comprises a metal sleeve or bushing 1 which is disposed centrally in the matrix of a mold in the usual manner. The bushing 1 is provided with a flanged portion 2 which is adapted to seat in a recessed portion of the base plate of the mold which is similar to the pressure platen 3. A plurality of disks 4 of fibrous sheet material such as paper, duck or other spinnable or non-spinnable textile fibers are disposed around the bushing 1, a sufficient number of such layers 4 being used to provide a cross section of a predetermined thickness through the web 5. A plurality of rings 6 of material the same as, or different from, material as that of the disks 4 are disposed around the sleeve 1 and built up on the disk 4 to provide a hub section of a predetermined thickness. Similarly, ring members 7 are superposed upon the disk 4 at the outer periphery thereof to provide a rim section of the same thickness of the hub section and a filler material 8 is provided in the space between the hub and rim sections in sufficient quantity to form a section between the web portion 5 of the structure of the desired density. A plurality of disks 4 are stacked on top of the built up layers and the filler material 8, and a pressure platen 3 having a raised portion 9 is pressed upon the assembled structure which is then subjected to the application of heat and pressure.

The disks and rings 4, 6 and 7 are, prior to the assembling operation, subjected to a treatment with a binding material such as a phenolic condensation product by immersing them therein to impregnate the same or by coating the outer surface. This operation is usually performed when the sheet material is in roll form to facilitate handling and the material so treated is subjected to a heat drying process to drive off the excess solvents which are employed in the binder.

Upon the application of heat and pressure to the built up materials as shown in Fig. 3, the heat will cause the binder to flow and the pressure will compact the softened material and upon subsequent and continued application of heat and pressure, the entire mass will solidify, thus forming an integral structure corresponding in shape to the wheel element shown in Fig. 2.

The filler material 8 molded between the layers 4 at the web section may consist of any suitable material, such as loose fibers, cork, string, rubber or a conglomerate of any or all of these materials and they may be prior to molding, treated with a binding agent, capable of reacting under heat to solidify the mass. The binder may be the same as that utilized in the disk and rings or other suitable binders may be employed depending upon the kind of filler materials utilized.

Referring to Fig. 2, the wheel element so formed consists of a rim section 10, a web portion 11 and a hub portion 12, the latter including the metal bushing 1. The web portion 11 is constricted, being so formed by virtue of the projection 9 on the pressure and base plates of the mold. The finished product constitutes an integral member which may be further manufactured into gear wheels or traction wheels as desired by imparting thereto the necessary machining operations.

It is evident from the foregoing description of our invention that composite wheel elements made in accordance therewith provide strong and durable wheels having a flexible section intermediate the hub and rim of certain desirable physical properties for facilitating smooth and noiseless operation. When rubber compositions are utilized in the web sections a very high degree of flexibility is attained which permits the alignment of the rim member with the rail if the wheel is used as a traction member, or with a co-operating gear wheel, if the rim is provided with teeth, without restraint by the hub portion.

Although we have described a specific embodiment of our invention, it will be obvious to those skilled in the art that various modifications may be made in carrying out the details of our process and in the choice of materials without departing from the principles herein set forth.

We claim as our invention:

1. A composite article comprising a disk member having radially laminated hub and rim portions and a partially laminated and partially heterogeneous web portion formed integrally therewith.

2. A composite article comprising a disk member having radially laminated hub and rim portions of fibrous sheet material, and a web portion of partially laminated and partially conglomerate filler material and a hardened binder.

3. A composite article comprising a disk member having a laminated hub and rim portion of fibrous sheet material, and a web portion of partially laminated and partially indiscriminately disposed fibrous material and a hardened binder, said laminated web portion constituting part of the hub and rim portions.

4. A composite article comprising a disk member having a laminated hub and rim portion of fibrous sheet material, and a web portion of partially laminated and partially shredded fibrous material and a hardened binder, said laminated web portion constituting part of the hub and rim portions, and said shredded portion comprising a molded center formed integral with said laminated portions.

5. A composite article comprising a disk member having a hub and rim portion of laminated fibrous sheet material, and a web portion of laminated fibrous sheet material having a string and cork center, said materials being consolidated with a hardened binder.

6. A composite article comprising a disk member having a hub and rim portion of laminated fibrous sheet material, and a web portion of laminated fibrous sheet material having a string, cork and rubber center, said materials being consolidated with a hardened binder.

7. A composite article comprising a disk member having radially laminated hub and rim portions of laminated fibrous sheet material, and outer web portions of laminated fibrous sheet material having a flexible body portion therebetween, said materials being consolidated with a hardened binder.

8. The method of making composite articles which comprises superposing a plurality of disk-shaped layers of fibrous sheet material treated with a binder, assembling a plurality of large and small rings of like material in concentric relation thereon, disposing a molding composition between said large and small rings, adding similarly shaped layers of similar material to form a cover and subjecting the assembled mass to heat and pressure to form a hardened integral mass.

9. A composite article comprising a laminated disk member formed with a totally enclosed annular channel, said channel being enclosed at its inner and outer portions with radially extending laminations and being filled with a conglomerate filler.

10. A composite article comprising a laminated disk member formed with a totally enclosed annular channel, said channel being enclosed at its inner and outer portions with radially extending laminations and being filled with a flexible conglomerate filler.

11. A composite article comprising a disk member having a laminated hub and rim portion of fibrous sheet material and a web portion composed of fibrous materials, a portion of the fibrous material in the web portion being laminated and varying substantially in density from the fibrous material constituting the remainder of the web.

12. A composite article comprising a laminated disk member formed with an enclosed annular channel containing fibrous material, said disk member including two series of radially extending laminated rings in spaced relationship, the inner series of laminated rings forming the inner wall of the channel and the outer series of laminated rings forming the outer wall of the channel.

13. A composite article comprising a disk member having two series of radially extending laminated rings in spaced relationship to each other and laminated sheets extending over the top and bottom of said rings forming an enclosed channel, said channel being filled with fibrous insulation.

In testimony whereof, we have hereunto subscribed our names this 5th day of February, 1925.

GEORGE C. KENT.
RUDOLF SIEGFRIED.